United States Patent [19]

Beaumont

[11] 4,272,705

[45] Jun. 9, 1981

[54] ANTI-RINGING CIRCUIT FOR CRT DEFLECTION YOKE

[75] Inventor: Gregory J. Beaumont, Arlington Heights, Ill.

[73] Assignee: Zenith Radio Corporation, Glenview, Ill.

[21] Appl. No.: 75,566

[22] Filed: Sep. 14, 1979

[51] Int. Cl.$^3$ .................. H01J 29/70; H01J 29/76
[52] U.S. Cl. .................................................. 315/408
[58] Field of Search .................. 315/408, 399, 411

[56] References Cited

U.S. PATENT DOCUMENTS

| 3,904,927 | 9/1975 | Wheatley, Jr. et al. | 315/408 |
| 4,042,858 | 8/1977 | Collette et al. | 315/408 |

Primary Examiner—Theodore M. Blum
Attorney, Agent, or Firm—Thomas E. Hill

[57] ABSTRACT

A cathode ray tube (CRT) in a video display utilizes an anti-ringing system for minimizing beam scanning distortion at the start of trace. This distortion is due to velocity modulation of the scanning beam caused by high frequency, resonant energy in the inductances of the linearity and width coils and the electromagnetic deflection yoke, all of which are in series. The first half of beam scan cycle is accomplished by the conduction of the damper diode while operation of the horizontal output transistor provides beam deflection current for the second half of horizontal sweep. A low impedance is introduced in the circuit for a short period during the start of damper diode current conduction by means of a voltage biasing diode network. This low impedance dampens out high frequency resonant ringing without degrading video display performance by excessive resistive loading.

4 Claims, 9 Drawing Figures

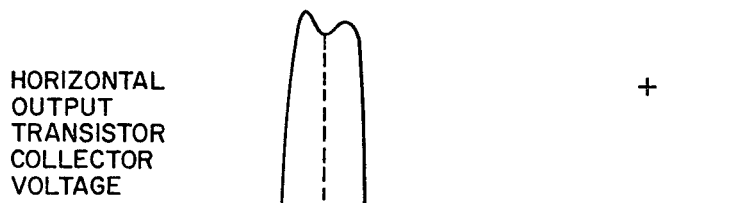
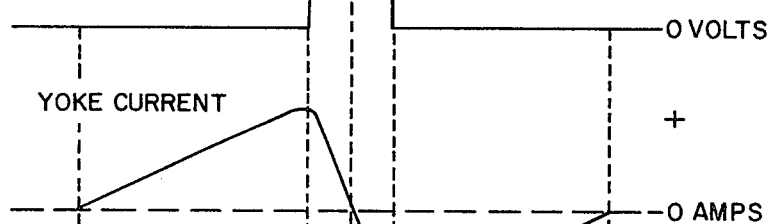
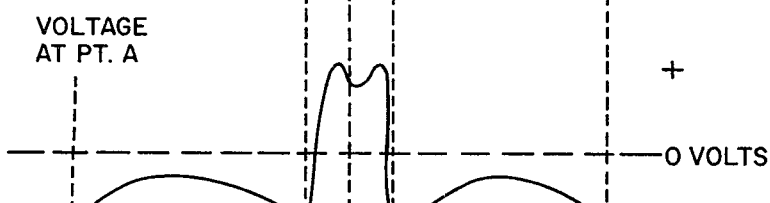
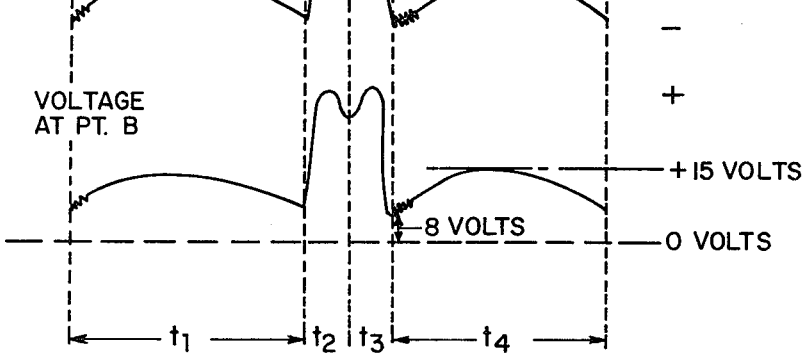

ANTI-RINGING CIRCUIT FOR CRT DEFLECTION YOKE

CROSS REFERENCE TO RELATED APPLICATIONS

This application is related to the following applications, all of which are assigned to the assignee of the present application: Ser. No. 077,517, filed Sept. 20, 1979, entitled "Horizontal Drive Circuit For Video Display," in the names of Richard Steinmetz and Gregory J. Beaumont, and Ser. No. 088,729, filed Oct. 26, 1979, entitled "Multivibrator Synchronization System For Video Display," in the name of Joseph Kadlec.

BACKGROUND OF THE INVENTION

The present invention relates to magnetic deflection of an electron beam in the cathode ray tube (CRT) of a video display and, more particularly, to means for minimizing the residual inductances in a ferromagnetic deflection coil system.

An electron beam in the CRT of a video display is deflected by means of multiple deflection coils as it scans the face of the CRT. It is by means of magnetic fields generated by the current-carrying deflection coils that the electron beam is accurately positioned on the CRT's faceplate. These deflection coils are generally mounted in the neck of the CRT with a sawtooth current producing the magnetic field required for rapid scanning and retrace by the electron beam. During the retrace period in which the beam is moved in a direction opposite to its scanning direction, the current in the deflection coils is reversed. However, due to self-resonances in the deflection coil drive circuit the deflection field does not entirely collapse. This residual energy and resulting magnetic field is evidenced by scan distortion following the retrace pulse. This is evident to the viewer as distortion or discontinuities on the extreme left-hand portion of the video display during the initial scanning phase of individual horizontal lines. The scanning electron beam undergoes velocity modulation at the start of trace on the extreme left side of the CRT faceplate due to the resonances present in the inductances of the deflection coils.

In a typical video display there are three sources of magnetic fields sufficient in magnitude to cause the aforementioned video presentation distortions. These three sources are the linearity coil, or lin coil, the horizontal width coil and the horizontal yoke deflection system. The lin coil generally is an inductor biased with a magnet so that its inductance changes with the amount and polarity of current passing through it. To compensate for internal losses due to the voltage drop across the lin coil, the width coil and the deflection yoke, the lin coil provides the deflection yoke with a distorted sawtooth voltage waveform during scan which compensates for the nonlinearity inherent in the deflection system. The horizontal width coil generally is a variable inductor capable of varying the amount of voltage provided to the deflection yoke. By thus varying the current passing through the yoke the width of the video display's presentation may be varied. The deflection yoke is the third, and most important, source of self-resonance resulting in scanning distortions following retrace. The yoke is comprised of the horizontal and vertical deflection coils for precisely positioning the electron beam on the CRT's fluorescent screen. Current of varying magnitude passed through the yoke generates the magnetic fields which control the deflection of the electron beam. It is the magnetic field produced by the self-resonance present after the termination of current through these components which causes distortion in the horizontal scan. This problem, while not significant in a television receiver which is overscanned, i.e., a receiver in which the horizontal beam scansion extends beyond the edges of the CRT, is particularly troublesome in a video display used in a non-television application since such a display is significantly underscanned.

The general approach disclosed in the prior art for solving this problem involves resistive loading of the lin and width coils and the yoke at all times during circuit operation. However, this attempt to filter out these spurious yoke signals results in unacceptably high power consumption. This is particularly undesirable in the case of a general application video display which typically is driven by a system of low power output.

One example of this approach is described in U.S. Pat. No. 3,456,149. Therein is described a means for reducing the residual magnetism in the ferromagnetic yoke of a CRT deflection system involving the incorporation of separate two-terminal networks across each of the deflection coils. Each two-terminal network is comprised of an adjustable resistor and a compensating coil with each network arranged to partially bridge in a shunt relationship its associated deflection coil.

Another approach to solving this problem is disclosed in U.S. Pat. No. 3,502,939 wherein is described a distortion-correcting apparatus for a magnetic deflection device including a magnetic core in the form of a cubic Wheatstone bridge configuration, a pair of coils respectively wound about the diagonal magnetic members of the Wheatstone bridge and means to connect the coils to an orthogonal magnetic field generating circuit with at least one of the coils being a deflection current generating coil. The deflection current generating coil acts as an output winding of the magnetic deflection device's flyback transformer.

The first approach described above is of a relatively simple design in which the adjustable resistor-compensating coil network acts to reverse the direction of current through the deflecting coil thus canceling out the residual magnetic field produced by that coil. The compensating coil in this network, however, produces its own magnetic field which must be taken into account in designing the CRT's deflection system. The second approach described above involves the generation of a compensating magnetic field. It represents a considerably more complex solution to this problem when such additional considerations as leakage fields and eddy currents in metal components must be addressed. In addition, the components of the prior art system must be precisely positioned in the video display relative to the existing magnetic deflection system.

The present invention, on the other hand, offers a more simple, efficient and effective solution to eliminating the residual inductance and resulting magnetic field of the electron beam deflection system. The present invention also represents a more direct and less complicated approach than the second invention discussed above.

OBJECTS OF THE INVENTION

It is an object of the present invention to provide an improved beam scanning system for a cathode ray tube.

It is another object of the present invention to provide an improved beam scanning system for a cathode ray tube by eliminating electromagnetic deflection yoke ringing due to resonant inductances in the deflection circuit.

It is yet another object of the present invention to provide an improved beam scanning system for a cathode ray tube in a video display system by eliminating unwanted magnetic deflection effects caused by resonant inductances of deflection circuit components without degrading the video display system with excessive resistive loading.

BRIEF DESCRIPTION OF THE DRAWINGS

The appended claims set forth those novel features believed characterisitic of the invention. However, the invention itself as well as further objects and advantages thereof, will best be understood by reference to the following detailed description of a preferred embodiment taken in conjunction with the accompanying drawings in which:

FIGS. 2a–2d show a set of waveforms indicating the current and voltage at several points in the anti-ringing circuit during operation.

DESCRIPTION OF THE PREFERRED EMBODIMENT

Figure 1:
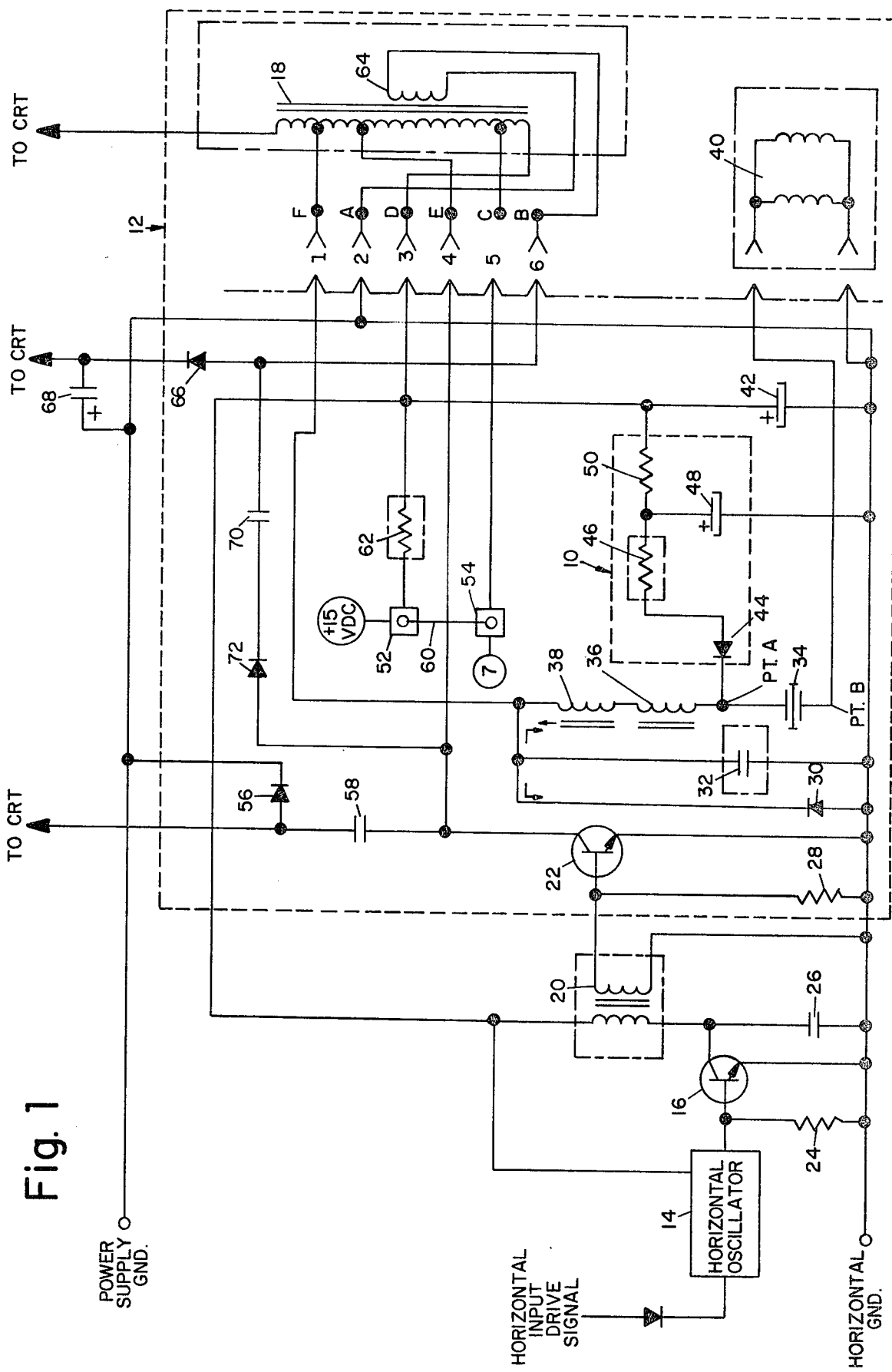
FIG. 1 is a circuit diagram illustrating the basic construction of an anti-ringing circuit for a CRT deflection system embodying the principles of the present invention.

Referring to the circuit diagram of FIG. 1, there is shown an anti-ringing circuit 10 in a horizontal sweep output circuit 12 of a video display in accordance with the present invention. Typically, a horizontal oscillator 14 provides a synchronized input signal to the horizontal driver 16 which in turn provides a drive signal to the horizontal output circuit 12. The horizontal oscillator 14, which may be a phase locked loop, a multivibrator or any of a great variety of signal synchronizers, is precisely synchronized to the input drive signal. It is this signal synchronization which permits the horizontal driver 16 to drive the horizontal sweep circuitry 12 for proper operation of the CRT (not shown). The output of the horizontal sweep circuit 12 energizes the high voltage sweep transformer 18 which supplies current directly to the deflection coils and acceleration grid system of the CRT.

The horizontal oscillator 14 processes the horizontal input drive signal to provide a re-synchronized, properly timed input waveform to the horizontal driver 16. A synchronization pulse which may have been in an improper timing position is thereby moved in real time, insofar as the video signal is concerned, into proper position.

The horizontal drive transistor 16 acts as on/off switch. In the "on" position it draws current through the horizontal drive transformer 20 storing energy in this transformer. When the horizontal drive transistor 16 is turned on, the horizontal output transistor 22, which is connected to the output of the horizontal drive transformer 20, is turned off thus providing a positive-going turn off signal to the horizontal output circuit 12. Thus, when the horizontal sweep output circuit 12 is under a high voltage condition during retrace, it is subject to a positive-going turn-off signal which provides positive control of the voltage applied to the base of the horizontal output transistor 22.

Resistor 24 provides an "off" resistance to the horizontal driver 16. The horizontal drive transformer 20 acts as a step down impedance matching transformer in that it converts 50 or 100 milliampere pulses of current into 500 milliampere pulses in order to drive the horizontal output transistor 22. Capacitor 26 acts as a voltage limiting capacitor such that when the horizontal output transistor 22 turns off, the horizontal driver 16 acts as an inductor resulting in a rapidly increasing voltage as the circuit resists the change in current caused by the rapid turn-off of the horizontal output transistor 22. Capacitor 26 thus provides a current path so that the voltage does not rise above the breakdown voltage of the horizontal output transistor 22. Resistor 28 provides for the suppression of higher frequency ringing created by the horizontal drive transformer 20.

With the horizontal output transistor 22 on during trace time and off during retrace time, a pulse waveform is generated on its collector with the pulse width of positive voltage approximately 8 to 9 microseconds in width and of approximately 150 peak voltage. During the remainder of the operating cycle, damper diode 30 and limiting capacitor 32 supply a voltage to the collector of the horizontal output transistor 22 which is approximately at ground (0.2 to 0.3 volts).

The horizontal output transistor 22 intially draws current from capacitor 34 through the lin (linearity) coil 36, the horizontal width coil 38 and the yoke 40, all of which are in series. The lin coil 36 is biased with a magnet so its inductance changes with the amount and polarity of current passing through it. A positive current reinforces the magnet's effect and lowers the inductance towards a pure air coil configuration. This produces a sawtooth of voltage which counteracts the non-linearity caused by the voltage drop across the resistance of the horizontal output circuit 12 including the effect of the yoke's resistance. This distorted waveform, by compensating for the current drain produced by the yoke 40 on the output current of the horizontal output transistor 22, generates the correct pulse waveform delivered to the yoke 40 to produce the required linearity on the yoke. The variable inductance, horizontal width coil 38 permits the voltage delivered to the yoke 40 to be varied thereby regulating the amount of beam deflection produced by the yoke. Damper, or retrace, capacitor 32 limits the peak voltage seen by the horizontal output transistor 22 when this transistor turns off. The inductance of the lin coil 36, the width coil 38 and the yoke 40 generates the voltage seen by the horizontal output transistor 22.

Capacitor 32 limits this peak voltage so that the collector rating of the horizontal output transistor 22 is not exceeded. In addition, capacitor 32 together with the reflected capacitance of the high voltage sweep transformer 18, the yoke 40 and the lin coil 36 inductance creates the retrace time. This retrace time determines the magnitude of the voltage delivered to the horizontal output transistor 22. Yoke coupling capacitor 34, which is designed for operation at high currents and high frequencies, disconnects the yoke 40 to preclude the passage of DC current through it. In addition, capacitor 34 further distorts the waveform delivered to the yoke by generating a parabolic voltage which compensates for the lack of a perfectly spherical picture tube. Capacitor 42 acts as a horizontal B+ voltage filter capacitor which provides filtering, holds the horizontal current within the operating boundaries of the horizontal sweep output circuit 12 and isolates the horizontal synchronization circuit, or oscillator, 14 from the source of input signals to preclude interference between the source of horizontal input pulses and the horizontal synchronization/drive circuit.

Pin 7 is an edge connector of the horizontal sweep output circuit 12 through which input power can be supplied. Connectors 52 and 54 provide additional input means to the horizontal sweep output circuit 12. The collector voltage of the horizontal output transistor 22 is used to generate a horizontal derived negative voltage to be supplied to the CRT. Diode 56 is clamped to capacitor 58 and limits the magnitude of the upper portion of a flyback pulse to 0.6 volts above ground which results in the delivery of a negative-going waveform of 150 volts. Capacitor 58 also acts as a filter for the voltage transmitted to the CRT. A jumper wire 60 connects input pin 7 to a +15 volt DC power supply to permit either 15 volts through pin 3 or another DC voltage through pin 5 to drive the high voltage sweep transformer 18. Resistor 62 provides a line resistance for the 15 volt DC output line. In order to supply 50 volts DC to the CRT from the pulse winding 64 of the high voltage sweep transformer 18 the input from pin B is rectified by diode 66 and filtered by capacitor 68. Current generated through capacitor 70 and diode 72 is transmitted to the focus control of the CRT.

In accordance with the present invention, the yoke anti-ringing circuit 10 includes diode 44, resistor 46, capacitor 48 and resistor 50. This invention operates to eliminate short duration, high frequency ringing of very low impedance produced by resonant inductance of the various components of the yoke drive circuit. The problem appears in the yoke and is evidenced by distortion caused by velocity modulation of the electron beam at the start of trace, or at the exteme left side of the video display screen. The resonant inductance of the lin coil 36, the width coil 38 and the yoke 40 all contribute to this distortion.

Figure 3A:
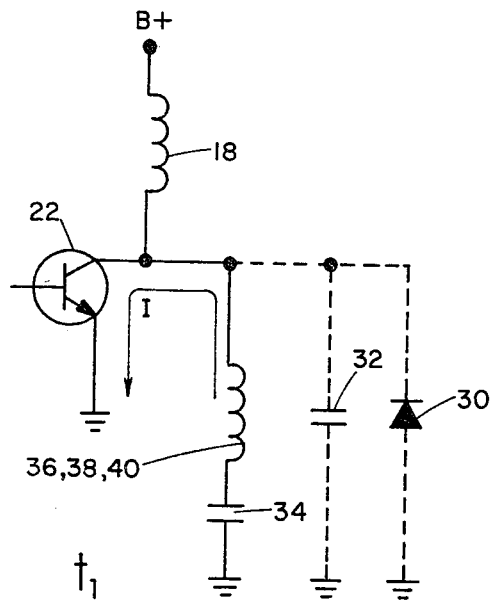
FIGS. 3a–3d show the flow of current through the anti-ringing circuit corresponding to the time intervals depicted in FIG. 2.

Referring to FIGS. 2A through 2D and 3A through 3D, the yoke anti-ringing circuit operates in the following manner. The horizontal output transistor 22 and damper diode 30 act to push and pull current to and from the yoke 40 in generating the sawtooth deflection current. In addition, current is pushed and pulled through the horizontal width coil 38 and the lin coil 36 due to changes in inductance in the circuit. As shown in FIGS. 2A and 2B, at the start of the horizontal sweep cycle the yoke current and the voltage at the collector of the horizontal output transistor 22 are zero. At the beginning of $t_1$ horizontal output transistor 22 is grounded while capacitor 34 is charged to approximately 12 volts. When the horizontal output transistor is turned on by means of an output pulse from the horizontal driver 16, the horizontal output transistor 22 begins drawing current from capacitor 34, yoke 40, lin coil 36 and horizontal width coil 38. As shown in FIG. 3A, during $t_1$ current is passing from ground to ground due to the slight discharge of capacitor 34. A small amount of current is transmitted to capacitor 34 from the high voltage sweep transformer 18, or B+ source, to restore a DC voltage on capacitor 34 in maintaining its charge. With the horizontal output transistor 22 turned on, the current through the yoke 40 increases with a positive current passing through transistor 22 until it reaches a peak value at the start of retrace, as shown in FIG. 2B. With the start of retrace, which is represented by $t_2+t_3$, the peak voltage on the collector of the horizontal output transistor 22 is limited by capacitor 32. During the first half of retrace the current drops very quickly to zero as it becomes transformed into damper capacitor 34 voltage. At the zero current point all energy is stored in damper capacitor 34 and the associated reflected capacitances on the damper capacitor. Then, due to the high voltage on yoke 40, the current through the yoke reverses.

Figure 3B:
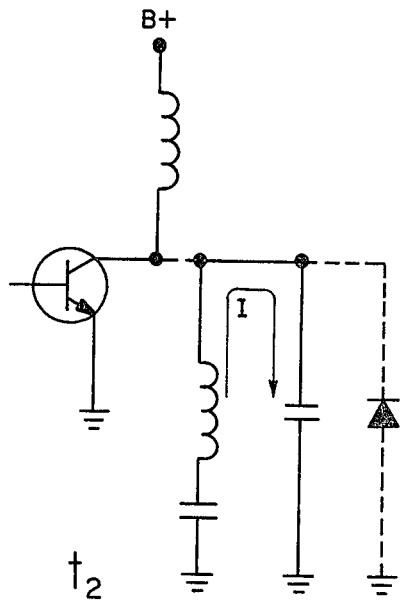

During $t_2$ horizontal output transistor 22 and damper diode 30 are not conducting and energy is flowing from the yoke 40 with damper capacitor 34 acting as a voltage source to draw current from the yoke 40. At the end of $t_1$ all energy is stored in the lin coil 36, the horizontal width coil 38 and the yoke 40. These inductors oppose current changes and as current across them begins to change due to damping capacitor 34 a large voltage opposing current change is built up across these three inductors. When the current equals zero, the voltage levels off at some peak value limited by damper capacitor 34. At the end of $t_2$ all voltage is stored in capacitor 32 as shown in FIG. 3B. Distortion in the peak voltage waveform shown in FIG. 2A is caused by reflected capacitances of the high voltage sweep transformer 18.

Figure 3C:
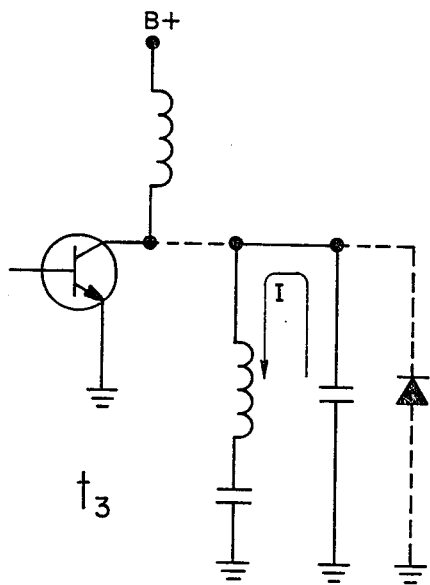
Figure 3D:
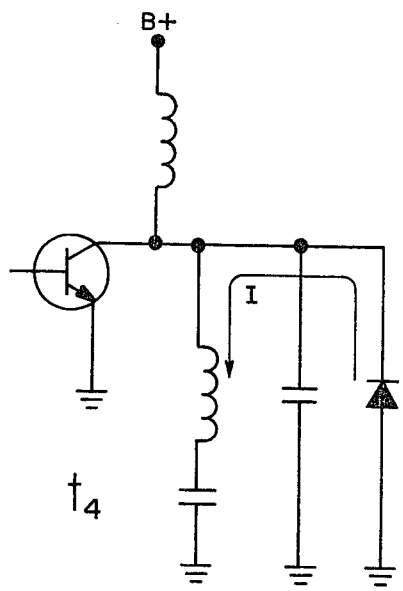

At the beginning of $t_3$ a high voltage across yoke 40 due to discharging damper capacitor 34 causes the current to reverse, thus forcing current back into the yoke 40 and producing a negative current peak almost exactly equal in magnitude to the positive current peak, as shown in FIGS. 2B and 3C. The end of $t_3$ marks the end of the retrace pulse with a maximum negative current passing through the yoke 40. During periods $t_1$ and $t_2$ the horizontal output transistor 22 conducts current. During periods $t_3$ and $t_4$ damper diode 30 conducts current while the yoke current is trying to reverse the voltage on the yoke and drive it negative. Damper diode 30 is now forward biased with one end at ground and the other end at a negative voltage, with current flowing from the damper diode 30 into the yoke 40 and recharging capacitor 34. With the yoke current at a negative peak, the yoke voltage, if left alone, would reverse and go negative thus generating a voltage sign wave. By reversing the yoke current at this negative peak, damper diode 34 damps out high frequency ringing caused by large negative voltages, and converts the yoke current into a smooth sinusoidal waveform. A change in current direction caused by damper diode 30 is due to changes in the voltage across the yoke inductors. As shown in FIG. 3D a negative voltage across these yoke inductors draws current through damper diode 30 from ground. The horizontal output transistor 22 must be turned on while damper diode 30 is conducting. Output transistor 22 is turned on by an output pulse from the horizontal driver 16 which must be at least as wide as the interval $t_1$.

The resonant ringing occurs at the end of $t_3$ when energy has returned to the yoke circuit inductors which are now recharged with current from damper capacitor 32. When the horizontal output transistor 22 stops conducting and damper diode 30 begins conducting, there is an attempt in the circuit to abruptly change current in the yoke 40 from negative-going to positive-going. This abrupt rate of current change creates a high frequency ringing as the negative-going rate abruptly decreases without any associated settling time. Damper diode 30 prevents large voltage pulses on the collector of horizontal output transistor 22 from going negative. This ringing is shown in FIGS. 2B through 2D at the beginning of $t_4$. The rapid initiation of damper diode conduction which reverses the rate of change of current to the yoke, produces a damped, semi-sinusoidal, high frequency ringing due to self-resonant inductances in the circuit.

The curve shown in FIG. 2C represents the voltage at point A in FIG. 1, or at the top of yoke capacitor 34 with 12 volts of bias with respect to ground added. FIG. 2D shows a curve representing the voltage across the bottom of yoke capacitor 34, or across the yoke itself, during the various time intervals discussed above. Resistor 46 in the anti-ringing circuit 10 is introduced at a cetain instant to dampen out ringing perturbances.

The B+ high voltage enters the horizontal sweep output circuit 12 via connector 52 and is stored in capacitor 48 through resistor 50. The 15 volt DC input is reduced by means of resistor 50 and filter capacitor 48 to approximately 7 or 8 volts. A DC voltage is thus developed at the junction of resistors 46 and 50. This voltage is very small so that capacitor 48 can discharge very quickly at a voltage below that which appears at point A.

The rapid discharge of capacitor 48 permits resistor 46 to temporarily load the deflection yoke drive circuit acting as a noise filter in damping out the high frequency ringing. While diode 44 is conducting it possesses very low impedance and with capacitor 48 at a low impedance, resistor 46 is connected from ground to the deflection yoke drive circuit. In this manner resistor 46 critically damps the yoke current and voltage waveforms to remove unwanted resonant ringing.

With diode 44 charged up, resistor 46 is loaded onto the ring circuit for a very short period, e.g., 3 to 4 microseconds, and then becomes reversed biased with resistor 46 no longer loading the circuit. The time resistor 46 is loaded on the circuit begins when the voltage at point A falls one diode drop below the voltage on capacitor 48. This permits the 100 ohms of resistor 46 to be loaded on the yoke drive waveform at exactly the right instant in time to take advantage of the filtering action of this low impedance.

Resistor 50 and capacitor 48 establish the voltage bias across resistor 46 while diode 44 permits resistor 46 to be connected to the yoke drive circuit at a specific time for the desired duration. In effect, the anti-ringing circuit 10 clamps the yoke drive circuit onto a higher point on the horizontal output pulse so that the deflection yoke 40 does not experience the natural ringing modes of the circuit. The anti-ring circuit 10 therefore provides the filtering action of a low resistance (100 ohms) without wasting an excessive amount of yoke power by permanently loading the deflection coils with a large resistance as in the prior art. The resulting degradation in video display performance is not present in applicant's invention.

There has thus been provided an anti-ringing circuit for use with a CRT deflection coil which, by introducing a low impedance on the yoke drive circuit for a very short period of time at the end of electron beam retrace, essentially eliminates video presentation distortions caused by resonant ringing of the deflection circuit without degrading video performance by excessive resistive loading.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. An anti-ringing system for eliminating spurious deflection signals caused by resonant inductances in an alternating current sweep drive circuit of a cathode ray tube in a video display, said sweep drive circuit including a plurality of coils for deflecting an electron beam and wherein electron beam scan is initiated by a flyback pulse, said anti-ringing system comprising in combination:
   a source of alternating current energizing the sweep drive circuit;
   a direct current power supply;
   first resistor means coupling the direct current power supply to the sweep drive circuit; and
   means for temporarily connecting said first resistor means to the sweep drive circuit immediately following the flyback pulse when the voltage in said circuit drops below a predetermined value thereby eliminating distortions in electron beam scan by damping out spurious deflection signals produced by resonant inductances in said sweep drive circuit.

2. A system in accordance with claim 1, wherein said means for temporarily connecting said first resistor means in the sweep drive circuit comprises diode conducting means in series with said first resistor means and coupled to capacitor means and second resistor means to connect the first resistor means to the sweep drive circuit when the voltage in said sweep drive circuit drops a predetermined value below the voltage on said capacitor means so as to forward bias said diode means to a current conducting state.

3. A system in accordance with claim 2, wherein said first resistor means is of a low resistance value thereby damping out high frequency resonant inductances in the sweep drive circuit without excessively loading the video display.

4. An anti-ringing system for eliminating spurious deflection signals caused by resonant inductances in an alternating current sweep drive circuit of a cathode ray tube in a video display, said sweep drive circuit including a linearity coil and a width coil in series with a deflection yoke wherein electron beam scan is initiated by a flyback pulse and controlled by a sawtooth current wave supplied to said deflection yoke with current to said deflection yoke for the first half of electron beam scan provided by first diode conducting means and current for the second half of electron beam scan provided by conducting transistor means, said anti-ringing system comprising in combination:
   an alternating current power supply for providing current to said sweep drive circuit;
   a direct current power supply;
   voltage biasing means including second diode conducting means, first resistor means and second resistor means in series, said voltage biasing means connecting the direct current power supply to the sweep drive circuit; and
   capacitor means coupled to said voltage biasing means between said first and second resistor means and ground, with said voltage biasing means coupled to said sweep circuit when the voltage on said capacitor means exceeds the voltage on said sweep drive circuit by a predetermined value so as to forward bias said second diode means to a current conducting state thereby damping out of said sweep drive circuit high frequency resonant inductances.

* * * * *